United States Patent [19]
Dahlin et al.

[11] Patent Number: 6,122,263
[45] Date of Patent: Sep. 19, 2000

[54] INTERNET ACCESS FOR CELLULAR NETWORKS

[75] Inventors: Steinar Dahlin, Järfälla; Frank Reichert, Vällingby; Ina Widegren, Stockholm, all of Sweden

[73] Assignee: Telefonaktiebolaget LM Ericsson, Stockholm, Sweden

[21] Appl. No.: 08/872,271

[22] Filed: Jun. 10, 1997

[51] Int. Cl.[7] .............................. H04L 12/28; H04L 12/66
[52] U.S. Cl. ........................ 370/329; 370/349; 370/353; 370/389; 370/401; 455/445; 455/450
[58] Field of Search .................................. 370/313, 465, 370/338, 349, 401, 352, 354, 355, 389, 353, 329; 395/200.57; 455/403, 445, 450, 553

[56] References Cited

U.S. PATENT DOCUMENTS

| | | | |
|---|---|---|---|
| H1641 | 4/1997 | Sharman | 379/60 |
| 5,590,133 | 12/1996 | Billstron et al. | 370/349 |
| 5,708,655 | 1/1998 | Toth et al. | 370/313 |
| 5,771,353 | 6/1998 | Eggleston et al. | 395/200.57 |
| 5,793,762 | 8/1998 | Penners et al. | 370/389 |
| 5,802,465 | 9/1998 | Hamalainen | 455/403 |
| 5,845,215 | 12/1998 | Henry et al. | 455/553 |
| 5,940,383 | 8/1999 | Willkie | 370/336 |

FOREIGN PATENT DOCUMENTS

| | | | |
|---|---|---|---|
| 0766490 | 4/1997 | European Pat. Off. | H04Q 7/24 |
| 9531060 | 11/1995 | WIPO | H04L 12/66 |
| 9621983 | 7/1996 | WIPO | H04L 12/56 |
| 9621984 | 7/1996 | WIPO | H04L 12/56 |
| 9702670 | 1/1997 | WIPO | H04H 1/00 |
| 9712452 | 4/1997 | WIPO | H04B 7/26 |
| 9728661 | 8/1997 | WIPO | H04Q 7/22 |

OTHER PUBLICATIONS

Fisher "Dual Mode Mobile Unit For Next Generation Digital Narrow Channel Cellular Telephone System", IEEE, pp. 543–547, Dec. 1988.

Digest of Papers of Compcon (Computer Society Conference) 1996, Technologies for the Information Superhighway, Santa Clara, CA; Feb. 25–28, 1996; *CDPD and Emerging Digital Cellular Systems*; XP000628458.

IEEE Communications Magazine, Jan. 1997; *IP Multicast for Mobile Hosts*; XP000683443.

Funkschau, May 25, 1990; *Datentransfer Ohne Draht Und Telefon*; XP000125313 (no translation).

*Primary Examiner*—Hassan Kizou
*Assistant Examiner*—John Pezzlo
*Attorney, Agent, or Firm*—Jenkens & Gilchrist

[57] ABSTRACT

A method and system are disclosed for use with a mobile radio network, which receives and analyzes packets from a packet-switched fixed network, such as the Internet, and depending on the type of information received (e.g., speech, low speed data, or high speed WWW data), routes the information over an appropriate radio air interface to a mobile radio terminal. The speech information can be routed to mobile radio terminals over a conventional circuit-switched mobile radio link (e.g., a GSM traffic channel), the low speed data can be routed over a packet-switched mobile radio link (e.g., a GPRS traffic data channel), and the high speed data can be routed over a wideband broadcast radio link (e.g., a DAB network radio link). As a result, mobile radio terminals can advantageously enjoy full access to the Internet and thereby communicate effectively over the Internet with other mobile and wire-bound terminals.

44 Claims, 2 Drawing Sheets

INTERNET ACCESS FOR CELLULAR NETWORKS

BACKGROUND OF THE INVENTION

1. Technical Field of the Invention

The present invention relates in general to the telecommunications field and, in particular, to a method and apparatus for mobile radio telephone users to communicate via the Internet.

2. Description of Related Art Today's cellular networks are designed to interconnect and interoperate with both Public Switched Telephone Networks (PSTNs) and Integrated Services Digital Networks (ISDNs). A common characteristic of these networks is that they are circuit-switched networks that handle relatively narrow bandwidth traffic.

In contrast, the rapidly growing "IP Network" or "Internet" is a packet-switched network which handles much wider bandwidth traffic than the circuit-switched networks. As such, most conventional wire-bound communications terminals are capable of fully utilizing the Internet's much wider bandwidths. However, a problem with using wireless (e.g., cellular) radio terminals to communicate with the Internet is that the wireless terminals are bandwidth limited by their respective radio air interfaces. A similar problem exists for Asynchronous Transmission Mode (ATM) or broadband ISDN communications systems, if these systems are being accessed by wireless radio terminals. Therefore, there is a need to overcome the bandwidth limitations of conventional wireless radio terminals, so that future wireless radio terminals can be utilized with packet-switched networks (or other wideband networks) to handle wideband traffic comparable to that handled by wire-bound terminals.

The air interface standards originally promulgated for cellular radio networks had been developed based on the use of specialized speech coding techniques. These coding techniques were optimized to allow the transmission of biteffective, two-way speech traffic over the radio air interface. Subsequently, the air interface standards for cellular networks were modified to allow the transmission of relatively low speed data over the radio air interface. Now these standards also allow both the uplink and downlink transmissions of packet data, with coding optimized for these types of transmissions. An example of such a packet data standard is the General Packet Radio Service (GPRS) Radio Interface for the Global System for Mobile Communications (GSM), which is described in GSM Technical Specification 04.60 published by the European Telecommunications Standards Institute (ETSI).

Notably, bandwidth requirements are asymmetrical for many telecommunication network applications. In other words, the information being transferred to a terminal (e.g., via the downlink in a radio environment) typically requires much more bandwidth than the information being transferred from the terminal (e.g., via the radio uplink). An example of such an asymmetrical application is the so-called "Video-On-Demand" (VOD) application, wherein the amount of data used to make a request for video (sent over the uplink) is relatively small in comparison to the large amount of video data sent in return (over the downlink). Consequently, in order to optimize these asymmetrical applications, the air interface protocols for such services as the Digital Video Broadcast (DVB) and Digital Audio Broadcast (DAB) are being standardized so these services can be provided.

In summarizing the current state of the art, there are a number of radio interface standards that are either in existence or being devised (e.g., GSM, DAB/DVB, etc.). Also, there are numerous methods being used to code information transmitted over particular air interfaces (e.g., speech coding in the GSM, or packet data handling in the GPRS). Consequently, in the future, all of the bandwidth requirements for these different standards and coding techniques will need to be considered and effectively optimized.

In contrast, in a strictly Internet environment, there is only one protocol needed (e.g., the IP network standard) to prescribe how information should be transmitted over the packet-switched network, because there is no such air interface bandwidth problem there. However, another significant problem arises in attempting to access a packet-switched, land-based network (e.g., Internet) with a wireless radio terminal, because of the difficulties encountered in transmitting wide bandwidth traffic over the radio links, and the different speech coding techniques involved.

For example, as mentioned above, one such problem is encountered when wide bandwidth traffic (e.g., from the Internet) is to be transmitted over the downlink radio air interface to a wireless radio terminal. Certain radio air interfaces, such as those used in the GSM and DAB systems, can provide the necessary downlink bandwidths required for typical applications used in packet-switched, land-based networks. However, the problem that remains is that there is no method available for use in combining the different interfaces involved.

In a cellular mobile radio network, a subscriber can "surf" the World-Wide Web (WWW) via the Internet by using a "laptop" personal computer (PC) as a radio terminal. The subscriber's search instructions can be readily conveyed over the uplink via the cellular network's radio air interface to a Mobile Services Switching Center (MSC). The instructions are then conveyed over the Internet via an Internet-connected server in accordance with the appropriate IP Standard protocol. However, in contrast, a much larger amount of information is conveyed over the downlink, and consequently, the process of transmitting such information over the radio link of a conventional cellular network is much too slow and thereby unacceptable to a subscriber, when compared to the much higher throughput of a typical wire-bound terminal.

The second problem is encountered when speech information is to be conveyed from a wireless radio terminal to the Internet. The transmission of speech information over a radio air interface is best accomplished by using a cellular circuit-switched connection. An example of such a connection is a Traffic Channel (TCH) in the GSM. On the other hand, the transmission of low speed data over a radio air interface is best accomplished by using a cellular packet-switched connection. An example of such a connection is a Packet Data Traffic Channel (PDTCH) in the GPRS. As such, while it is usually preferable to transmit speech and data over the air waves via different radio channels with specialized coding, the corresponding speech and data information can be conveyed over the Internet using a single packet data connection. Consequently, there appears to be no particular bandwidth problem for applications on the Internet that convey speech and low speed data. Nevertheless, there is still a problem associated with the process of selecting appropriate channels and procedures to be used for transcoding and conveying speech and low speed data between the packet-switched and cellular radio networks.

SUMMARY OF THE INVENTION

In order to resolve these problems, it is, therefore, an object of the present invention to provide a mobile radio terminal with access to a packet-switched fixed network such as the Internet.

It is another object of the present invention to enable routing of wideband traffic from a packet-switched fixed network over a radio air interface to a wireless radio terminal.

It is yet another object of the present invention to provide a capability for routing speech, low speed data, and high speed data over a downlink radio air interface to a mobile radio terminal.

It is still another object of the present invention to enable mobile radio terminals to communicate over a radio link with any one of a land-based packet-switched network, a mobile packet-switched network, or a mobile circuit-switched network.

In accordance with the present invention, the foregoing and other objects are achieved by a method and system for use with a mobile radio network that receives and analyzes packets from a packet-switched fixed network, such as the Internet, and depending on the type of information received (e.g., speech, low speed data, or high speed WWW data), routes the information over an appropriate radio air interface to a mobile radio terminal. For example, the speech information can be routed to mobile radio terminals over a conventional circuit-switched mobile radio link (such as a GSM traffic channel), the low speed data can be routed over a packet-switched mobile radio link (such as a GPRS traffic channel), and the high speed data can be routed over a wideband broadcast radio link (such as a Digital Audio Broadcast network radio link). As a result of the present invention, mobile radio terminals can now enjoy full access to the Internet and thereby communicate effectively over the Internet with other terminals.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
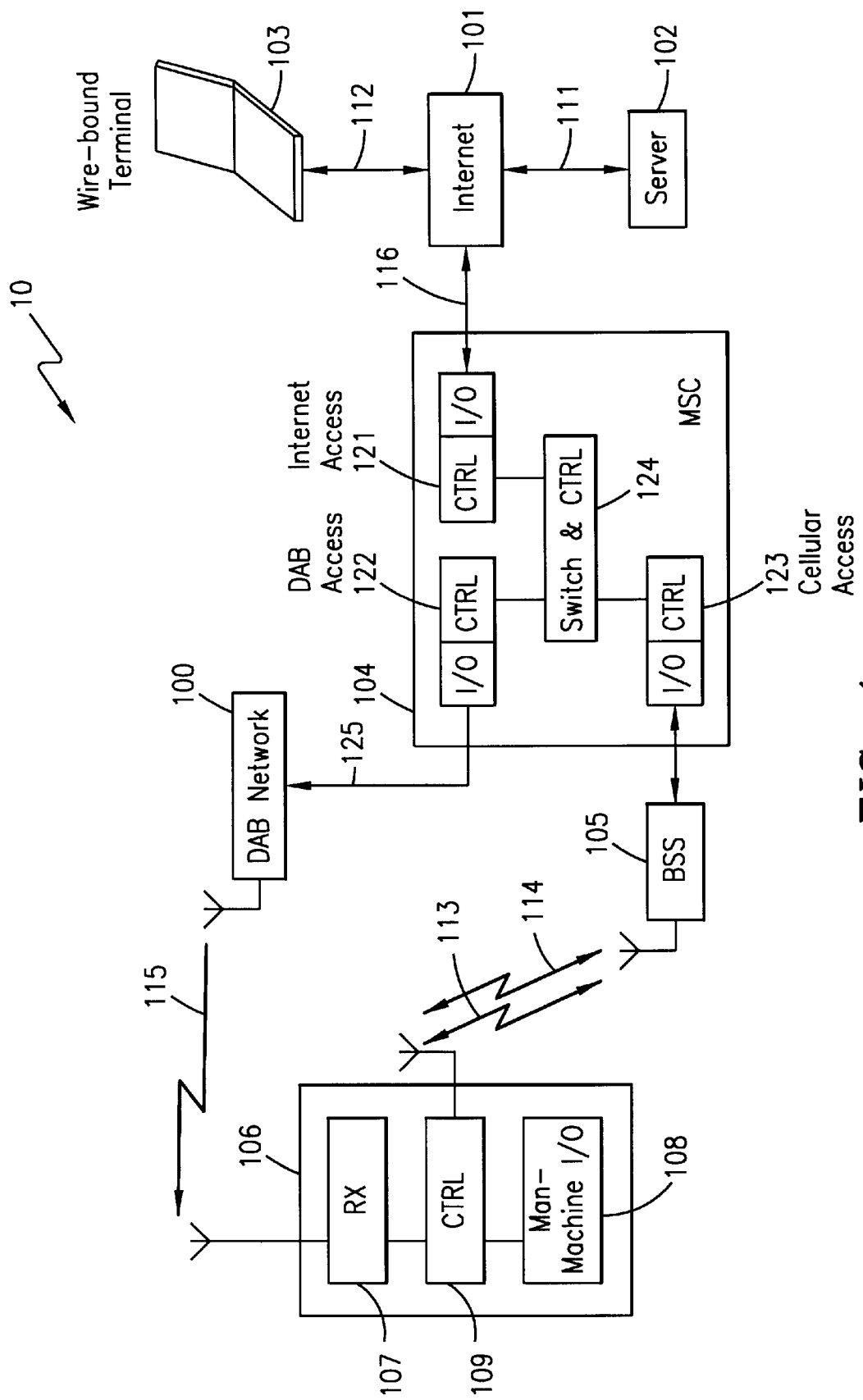
FIG. 1 is a block diagram that illustrates an exemplary system that can be used to implement a preferred embodiment of the present invention.
Figure 2:
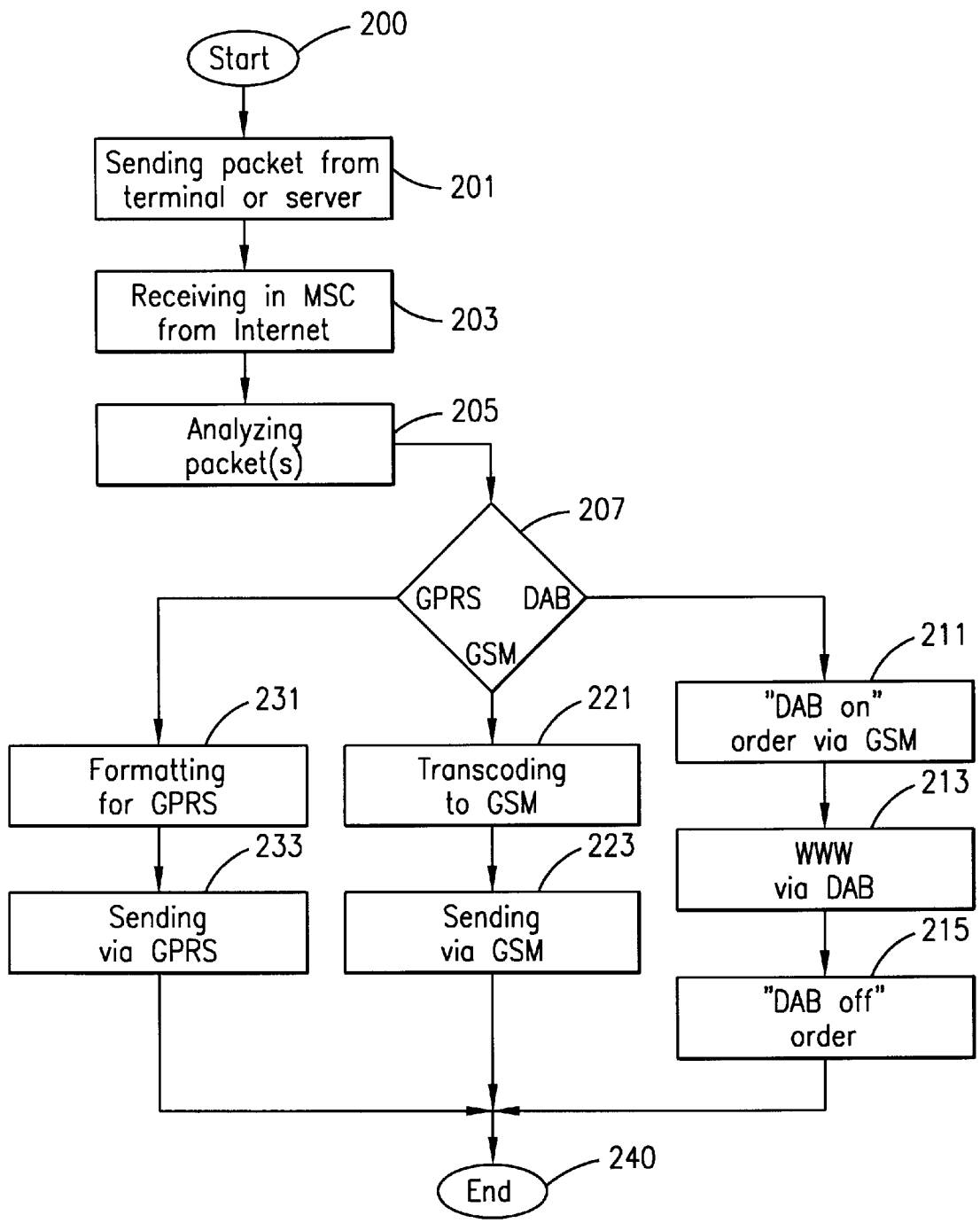
FIG. 2 is a flow diagram of an exemplary method that illustrates how a system (such as that shown in FIG. 1) can transfer information between a packet-switched network and a wireless radio terminal, in accordance with the preferred embodiment of the present invention.

The preferred embodiment of the present invention and its advantages are best understood by referring to FIGS. 1–2 of the drawings, like numerals being used for like and corresponding parts of the various drawings.

FIG. 1 is a block diagram that illustrates an exemplary system that can be used to implement a preferred embodiment of the present invention. For this embodiment, system 10 includes a packet-switched network 101 (e.g., Internet). A WWW server 102 and a wire-bound terminal 103 (e.g., a personal computer) are connected for two-way communications by lines 111 and 112, respectively, to the packet-switched network 101. System 10 also includes a mobile communications network (e.g., a cellular radio network such as the GSM) which further includes a MSC 104, a base station subsystem (BSS) 105, and a wireless radio terminal 106.

The radio terminal 106 is coupled to BSS 105 via a first radio link (e.g., cellular air interface) for two-way communications therebetween. Preferably, the radio terminal includes a cellular control and transceiver subsection 109 (e.g., for the GSM) and a Digital Audio Broadcast (DAB) receiver subsection 107. The radio terminal can thereby receive both low speed data with the cellular transceiver (e.g., up to about 10–100 kbps for the GSM) and high speed data with the DAB receiver (e.g., up to about 1.5 Mbps for the DAB).

The MSC 104 is connected to a DAB network 100. Information from MSC 104 is coupled via a connection 125 to DAB network 100, which broadcasts this information via a second radio interface 115 to radio terminal 106. The (DAB) receiving section 107 of radio terminal 106 detects and processes the information that was broadcast from DAB network 100. Radio terminal 106 also includes an input/output (I/O) interface 108, such as, for example, a keyboard/display for inputting or displaying data and an audio I/O section for inputting or outputting speech information. Additionally, radio terminal 106 includes the control and transceiver subsection 109, which continuously controls the cellular air interface (e.g., GSM) functions of the radio terminal but, on command, can also switch over to control the radio terminal's DAB network air interface functions.

Essentially, the MSC (104) provides the radio terminal 106 with access to the IP Network. Preferably, all of the Internet traffic destined for the radio terminal flows through the mobile network's MSC. So, the wideband traffic from the IP Network can be routed over the wideband DAB network to the radio terminal, and the narrowband traffic can be routed to the radio terminal via the packet-switched (e.g., GPRS) or circuit-switched (e.g., GSM speech) air-interfaces.

Specifically, MSC 104 includes an Internet access interface section 121, DAB access interface section 122, and cellular interface section 123, which provide appropriate interfaces between the MSC and packet-switched network (101), DAB network (100), and the BSS (105), respectively. Each of these interface sections comprises an I/O part facing the respective external interface, and a control part comprising an ordinary processor that performs the required code translations and extraction of control information from message headers, in accordance with procedures known to those of ordinary skill in this field. The control information may comprise, for example, the addressee, the sender (e.g., for charging purposes), the internet operator, the cellular operator, the format type of the message, etc. The control parts of the receiving interface sections (121, 122, 123) send the received and extracted control information together with the message to the switch and control (CTRL) section 124 associated with the MSC functions where the routing decisions are made based on the extracted control information, and where the message and control information are routed for output to the selected output interface sections 121, 122, 123 (as described below with respect to FIG. 2).

The cellular air interface is denoted by two bi-directional arrows 113 and 114. Arrow 113 indicates a circuit-switched speech connection that, for example, uses a time slot on a pair (uplink and downlink) of carrier frequencies. Arrow 114 indicates a packet-switched data connection that, for example, uses another time slot on the same pair of carrier frequencies used by the speech connection. The DAB air interface is denoted by a uni-directional arrow 115, which indicates a downlink from the DAB network 100 to the radio terminal 106. A packet-switched connection 116 is shown between the MSC 104 and the packet-swiched network 101.

Connection 116 can be used to transfer information between the packet-switched network 101 and radio terminal 106, and also for communication between other radio terminals (not explicitly shown) served by MSC 104 and the packet-switched network. An example of a signalling protocol that can be used by the mobile station(s) and base station for use in switching between speech and data being conveyed over the radio air interface (links 113 and 114, respectively) is set forth in GSM Technical Specification 04.08.

FIG. 2 is a flow diagram of an exemplary method that illustrates how a system (e.g., system 10 shown in FIG. 1) can transfer information between a packet-switched network (e.g., Internet 101) and a wireless radio terminal (e.g., mobile terminal 106), in accordance with the preferred embodiment of the present invention. At step 201, a packet of information to be communicated is transferred from server 102 or terminal 103 via a respective communications line 111 or 112 to the packet-switched network 101. At step 203, the packet of information is transmitted from the packet-switched network 101 to access section 121 in MSC 104 via communications line 116. MSC 104 can also receive (via line 116) packets of information from other terminals (not explicitly shown), which are also connected to the packet-switched network and communicating with at least one wireless radio terminal (e.g., terminal 106) operating under the control of MSC 104. At step 205, switch and control section 124 in MSC 104 analyzes each packet received in access section 121, in order to determine what transmission path should be used to transfer the information packets from access section 121 to radio terminal 106.

At step 207, depending upon certain switching criteria and decisions made (to be described below), the switch and control section 124 determines whether to transfer the information packet to the mobile radio terminal over the radio air interface via a circuit-switched speech connection (e.g., via a GSM TCH over link 113), a packet-switched connection (e.g., via a GSM GPRS channel over link 114), or a wideband network radio link (e.g., DAB network 100 and link 115).

For example, one switching decision (step 207) that can be made by the switch and control section 124 is when a receive buffer overflow message is received in the MSC 104, which indicates that circuit-switched radio air interface (e.g., link 113) is too "slow" a medium to handle the amount of incoming traffic in an ongoing transmission from the packet-switched network (101). In this instance, the switching and control section 124 can route the succeeding incoming packet information over the packet-switched or wideband radio link (e.g., 114 or 115, respectively).

A second exemplary switching decision that can be made by switch and control section 124 is when the MSC 104 receives an instruction, for example, in a control message from the server 102 or any terminal that initiated the transmission, which directs the MSC to switch from one connection to another. In this instance, the switch and control section can reroute the transmission, for example, from the circuit-switched radio air interface (e.g., link 113) to the packet-switched or wideband radio link 114 or 115, respectively (or vice versa), or from the wideband radio link to the packet-switched radio link 114 (or vice versa).

A third exemplary switching decision that can be made by switching and control section 124 is when the MSC 104 receives a code sequence in one or more packets being received from the packet-switched network 101, which indicates the type of server (e.g., WWW server) which originated the packet and information that was received. In this instance, for example, upon receiving a code sequence that indicates a WWW server as the packet originator, the switch and control section 124 can route the transmission over the packet-switched connection (e.g., GPRS link 114).

A fourth exemplary switching decision that can be made by switch and control section 124 is when the MSC 104 receives a control message from another node in the mobile radio network associated with the MSC, which directs the MSC to switch to a particular connection (e.g., due to traffic congestion on one or more of the connections, or one connection may be inexpensive to use relative to another).

Returning to step 207, based on the above-described examples and any other appropriate switching criteria, if the switch and control section 124 selects the wideband (e.g., DAB) network route to transmit the received information packet(s), then at step 211, the MSC can convey a control message (e.g., over a GSM TCH via link 113 or a GPRS PDTCH via link 114) to the control section 109 of the radio terminal 106, which orders the radio terminal to switch on the receiver section 107. The MSC can resend this order at periodic intervals for as long as the wideband network route is selected. At step 213, the switch and control section 124 routes the received information packet (e.g., a WWW packet generated by server 102) from the packet-switched network access section 121, through the wideband (DAB) access section 122, and the wideband (DAB) network 100 broadcast transmitter (via link 115). The transmitted information packet is received and processed by the receiver section 107 in radio terminal 106. At step 215, when the information packet transmission is terminated (e.g., at server 102), the switch and control section 124 can transmit an order in a control message (e.g., via the GSM TCH or GPRS PDTCH) that directs the radio terminal control section 109 to switch off the receiver section 107. Alternatively, the radio terminal control section 109 can employ time-out circuitry (not explicitly shown) that switches off the receiver section under certain conditions after a predetermined amount of time.

Returning to step 207, if the packet-switched connection is selected, then at step 231, the information packet is reformatted in accordance with a standard packet-switched protocol (e.g., the GPRS standard is different than the IP network standard). At step 233, the reformatted packet is transmitted via the packet-switched connection (e.g., GPRS) to the radio terminal 106, in the time slot associated with the packet-switched radio link 114.

Returning again to step 207, if the circuit-switched connection (e.g., GSM) is selected, at step 221, the packet to be transmitted can be assumed to contain speech information and is, therefore, transcoded in the cellular transcoder section 123 into the speech code used in the circuit-switched network. At step 223, the transcoded packet is transmitted over the circuit-switched radio air interface (e.g., via a TCH in the GSM) to radio terminal 106, using the time slot associated with the radio link 113. The switching operation is terminated at step 240.

In order to transfer speech or data information from a mobile radio terminal (e.g., terminal 106) to the packet-switched network (e.g., Internet 101), the control unit in the mobile terminal can generate a control message that is received by the MSC 104, which informs the MSC that either speech or data is to be transferred in the uplink direction. The control message can be sent to the MSC in accordance with a standard signalling protocol (e.g., GSM Technical Specification 04.08) over the circuit-switched link 113. The message can be transmitted by the mobile station and conveyed over the circuit-switched link 113 (speech) or packet-switched link (data). The access section 121 in the MSC 104 can transform the speech or data information into an appropriate packet-switched network code (e.g., in accordance with a standard Internet protocol).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a communication system comprising a packet-switched fixed network connected to a mobile radio network including a switch operable to route to a radio terminal information in at least one of a first code and second code, a method for optimizing transmission of the information from the packet-switched fixed network to the radio terminal, comprising the steps of:

said switch receiving from the packet-switched fixed network at least one packet of the information destined for the radio terminal, said packet coded according to a third code;

determining, from said at least one packet of the information coded according to said third code and a link characteristic associated with said radio link to said radio terminal, which of said first code or said second code is preferred for use in transmission of said packet over a radio link to said radio terminal;

transcoding said information coded according to said third code into said preferred first code or second code according to said step of determining; and conveying said transcoded information over said radio link to said radio terminal.

2. The method according to claim 1, wherein said packet-switched fixed network comprises an Internet.

3. The method according to claim 1, wherein said mobile radio network comprises a GSM network.

4. The method according to claim 1, wherein said first code comprises speech.

5. The method according to claim 1, wherein said second code comprises low speed data.

6. The method according to claim 1, wherein said switch comprises a mobile services switching center.

7. In a communication system comprising a packet-switched fixed network connected to a mobile radio network including a switch and at least one radio terminal, said switch coupled to a broadcast network and operable to route to said radio terminal information over at least one of a first radio interface and a second radio interface, each of said first and second radio interfaces optimized for radio transmission of a predetermined type of the information, a method for optimizing transmission of the information from the packet-switched fixed network to the mobile radio network, comprising the steps of:

said switch receiving from the packet-switched fixed network at least one packet of the information destined for the radio terminal, said packet coded according to a first code;

determining from said at least one packet of the information coded according to said first code and a link characteristic associated with said radio link to said radio terminal, which of said first radio interface or said second radio interface is preferred for use in transmission of said packet to said radio terminal;

transcoding the information coded according to said first code into a second code associated with said preferred radio interface according to said step of determining; and conveying said transcoded information over said preferred radio interface to said radio terminal.

8. The method according to claim 7, wherein said packet-switched fixed network comprises an Internet.

9. The method according to claim 7, wherein said mobile radio network comprises a GSM network.

10. The method according to claim 7, wherein said broadcast network comprises a Digital Audio Broadcast network.

11. The method according to claim 7, wherein said switch comprises a mobile services switching center.

12. The method according to claim 7, wherein said first radio interface comprises a GSM air interface.

13. The method according to claim 7, wherein said second radio air interface comprises a Digital Audio Broadcast air interface.

14. The method according to claim 7, wherein said predetermined type of the information comprises at least one of speech, slow data, and fast World Wide Web data.

15. The method according to claim 7, wherein said second code comprises a standard Internet code.

16. In a communication system comprising a packet-switched fixed network connected to a mobile radio network including a switch and at least one radio terminal, said switch coupled to a broadcast network and operable to route information to said radio terminal over any selected one of a plurality of radio interfaces, a method for optimizing transmission of the information from the packet-switched fixed network to the mobile radio network, comprising the steps of:

said switch routing the information over one of the radio interfaces;

determining that a link characteristic associated with said one radio interface to the mobile radio network is below a desired rate;

in response to said determining step, deciding that said switch should route the information over another of said plurality of radio interfaces instead of said one radio interface;

in response to said deciding step, transcoding the information in accordance with a protocol of said another of said plurality of radio interfaces; and routing said transcoded information over said another of said plurality of radio interfaces.

17. The method according to claim 16, wherein said packet-switched fixed network comprises an Internet.

18. The method according to claim 16, wherein said mobile radio network comprises a GSM network.

19. The method according to claim 16, wherein said broadcast network comprises a Digital Audio Broadcast network.

20. The method according to claim 16, wherein said switch comprises a mobile services switching center.

21. The method according to claim 16, wherein at least one of said plurality of radio interfaces comprises a GSM air interface.

22. The method according to claim 16, wherein at least one of said plurality of radio air interfaces comprises a Digital Audio Broadcast air interface.

23. The method according to claim 16, wherein least one of said plurality of radio air interfaces comprises a GPRS air interface.

24. The method according to claim 16, wherein said information comprises at least one of speech, slow data, and fast World Wide Web data.

25. The method of claim 16, wherein said determining step further includes determining that an arrival rate of the information at said switch is higher than a departure rate of the information from said switch.

26. In a communication system comprising a packet-switched fixed network connected to a mobile radio network including a switch and at least one radio terminal, said switch coupled to a broadcast network and operable to route information to said radio terminal over any selected one of a plurality of radio interfaces, a method for optimizing transmission of the information from the packet-switched fixed network to the mobile radio network, comprising the steps of:

said switch routing the information over one of the radio interfaces;

determining, using at least one link characteristic associated with said radio interfaces, that another of the radio interfaces is less expensive to use than said one radio interface;

in response to said determining step, deciding that said switch should route the information over said another of said plurality of radio interfaces instead of said one radio interface;

in response to said deciding step, transcoding the information in accordance with a protocol of said another of said plurality of radio interfaces; and routing said transcoded information over said another of said plurality of radio interfaces.

27. The method according to claim 26, wherein, in said step of determining, said at least one link characteristic is the bit rate of said information from the packet-switched fixed network to the mobile radio network.

28. The method according to claim 26, wherein, in said step of determining, said at least and link characteristic is buffer overflow of said information from the packet-switched fixed network to the mobile radio network.

29. The method according to claim 26, wherein, in said step of determining, said at least one link characteristic further includes at least one control information selected from the group consisting of: addressee, sender, internet operator, cellular operator, control command and sending server type.

30. The method according to claim 1, wherein, in said step of determining, said link characteristic is the bit rate of said information from the packet-switched fixed network to said radio terminal.

31. The method according to claim 1, wherein, in said step of determining, said link characteristic is buffer overflow of said information from the packet-switched fixed network to said radio terminal.

32. The method according to claim 1, wherein, in said step of determining, said at least one link characteristic further includes at least one control information selected from the group consisting of: addressee, sender, internet operator, cellular operator, control command and sending server type.

33. The method according to claim 7, wherein, in said step of determining, said link characteristic is the bit rate of said information from the packet-switched fixed network to said radio terminal.

34. The method according to claim 7, wherein, in said step of determining, said link characteristic is buffer overflow of said information from the packet-switched fixed network to said radio terminal.

35. The method according to claim 7, wherein, in said step of determining, said at least one link characteristic further includes at least one control information selected from the group consisting of: addressee, sender, internet operator, cellular operator, control command and sending server type.

36. The method according to claim 16, wherein, in said step of determining, said link characteristic is the bit rate of said information from the packet-switched fixed network to the mobile radio network.

37. The method according to claim 16, wherein, in said step of determining, said link characteristic is buffer overflow of said information from the packet-switched fixed network to the mobile radio network.

38. The method according to claim 16, wherein, in said step of determining, said link characteristic further includes at least one control information selected from the group consisting of: addressee, sender, internet operator, cellular operator, control command and sending server type.

39. A mobile terminal connected to a mobile radio network for optimizing reception of information from a packet-switched fixed network to said mobile radio network, said mobile terminal comprising:

a first receiver for receiving data at a first bandwidth capacity data rate across a first radio interface;

a second receiver for receiving data at a second bandwidth capacity data rate across a second radio interface, said second bandwidth capacity data rate being greater than said first bandwidth capacity data rate; and selection means for selecting between said first and second receivers for receiving data, said selection means selecting pursuant to at least one control information.

40. The mobile terminal according to claim 39, wherein said control information is selected from the group consisting of: addressee, sender, internet operator, cellular operator, control command and sending server type.

41. The mobile terminal according to claim 39, wherein said control information is extracted from a message header for said data received.

42. A mobile services switching center connected to a mobile radio network for optimizing transmission of information from a packet-switched fixed network to a mobile terminal, said mobile services switching center comprising:

a first transceiver for transceiving data at a first bandwidth capacity data rate across a first radio interface;

a second transceiver for transceiving data at a second bandwidth capacity data rate across a second radio interface, said second bandwidth capacity data rate being greater than said first bandwidth capacity data rate; and selection means for selecting between said first and second transceivers for transceiving data, said selection means selecting pursuant to at least one control information.

43. The mobile terminal according to claim 42, wherein said control information is selected from the group consisting of: addressee, sender, internet operator, cellular operator, control command and sending server type.

44. The mobile terminal according to claim 42, wherein said control information is extracted from a message header for said data received.

* * * * *